United States Patent
Powell et al.

(10) Patent No.: US 8,867,564 B2
(45) Date of Patent: Oct. 21, 2014

(54) METHOD AND SYSTEM FOR AN EXTENDED RANGE ETHERNET LINK DISCOVERY SIGNALING

(75) Inventors: Scott Powell, Carlsbad, CA (US); Kuang-Chou Chang, San Jose, CA (US); Bruce Conway, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 771 days.

(21) Appl. No.: 11/686,867

(22) Filed: Mar. 15, 2007

(65) Prior Publication Data
US 2008/0069014 A1 Mar. 20, 2008

Related U.S. Application Data

(60) Provisional application No. 60/826,161, filed on Sep. 19, 2006.

(51) Int. Cl.
| | |
|---|---|
| *H04L 5/14* | (2006.01) |
| *H04L 12/413* | (2006.01) |
| *H04L 29/06* | (2006.01) |
| *H04L 12/403* | (2006.01) |

(52) U.S. Cl.
CPC ............ *H04L 12/413* (2013.01); *H04L 5/1438* (2013.01); *H04L 69/24* (2013.01); *H04L 12/403* (2013.01)
USPC ........................................................ 370/465

(58) Field of Classification Search
CPC . H04L 12/413; H04L 5/1438; H04L 12/4013; H04L 29/06537; H04L 69/24
USPC ............................................................ 370/445
IPC ......................................................... H04L 12/413
See application file for complete search history.

(56) References Cited

U.S. PATENT DOCUMENTS

| | | | | |
|---|---|---|---|---|
| 6,457,055 | B1 * | 9/2002 | Hwong et al. | 709/227 |
| 6,504,849 | B1 * | 1/2003 | Wang et al. | 370/455 |
| 6,571,181 | B1 * | 5/2003 | Rakshani et al. | 702/60 |

(Continued)

OTHER PUBLICATIONS

IEEE Standard 802.3, Part 3: Carrier Sense Multiple Access with Collision Detection (CSMA/CD) Access Method and Physical Layer Specification (Apr. 24, 2005).*

(Continued)

*Primary Examiner* — Benjamin Lamont
(74) *Attorney, Agent, or Firm* — Oblon, Spivak, McClelland, Maier & Neustadt, L.L.P.

(57) ABSTRACT

Aspects of a method and system for extended range Ethernet link discovery signaling are provided. A local PHY may detect of one or more active twisted-pair wires in a remote PHY in extended range applications. The local PHY may determine whether to operate as a master or slave based on detected pairs. When operating as a master device, the local PHY may correct twisted-pair wire swap information received from the remote PHY before communicating an encoded link length value to the remote PHY. When operating as a slave device, the local PHY may transmit encoded twisted-pair wire swap information to the remote PHY before recovering a link length value communicated from the remote PHY. The local PHY may communicate supported operating modes based on the link length value to the remote PHY. Moreover, the local PHY may enable establishing a common full duplex operating mode with the remote PHY.

31 Claims, 10 Drawing Sheets

(56) References Cited

U.S. PATENT DOCUMENTS

| | | | |
|---|---|---|---|
| 6,795,450 B1 * | 9/2004 | Mills et al. | 370/463 |
| 6,980,007 B1 * | 12/2005 | Lo et al. | 324/543 |
| 7,161,911 B1 * | 1/2007 | Fang et al. | 370/282 |
| 2002/0027888 A1 * | 3/2002 | Creigh | 370/282 |
| 2003/0126486 A1 * | 7/2003 | Bui | 713/320 |
| 2004/0091027 A1 * | 5/2004 | Booth | 375/219 |
| 2004/0096004 A1 * | 5/2004 | Wang | 375/257 |
| 2005/0030808 A1 * | 2/2005 | Brown et al. | 365/222 |
| 2005/0135413 A1 * | 6/2005 | Yang et al. | 370/463 |
| 2006/0092967 A1 * | 5/2006 | Bergeron et al. | 370/463 |
| 2006/0251158 A1 * | 11/2006 | Isachar et al. | 375/219 |

OTHER PUBLICATIONS

IEEE Computer Society: Part 3: Carrier Sense Multiple Access with Collision Detection Access Method and Physical Layer Specifications Amend. 1: Physical Layer and Mgmt Parameters for 10 Gb/s Operation,, Sep. 1, 2006 XP0002462041.

Taborek, R: "Auto-Negotiation" Jun. 1, 1999, pp. 1-9, XP002462042.

Communication dated Oct. 2, 2009 forwarding EP examination report received for European Application No. 07011333.7.

Taiwanese Office Action issued May 11, 2012 in Taiwanese Application No. 96134832, 8 pages (no English translation).

* cited by examiner

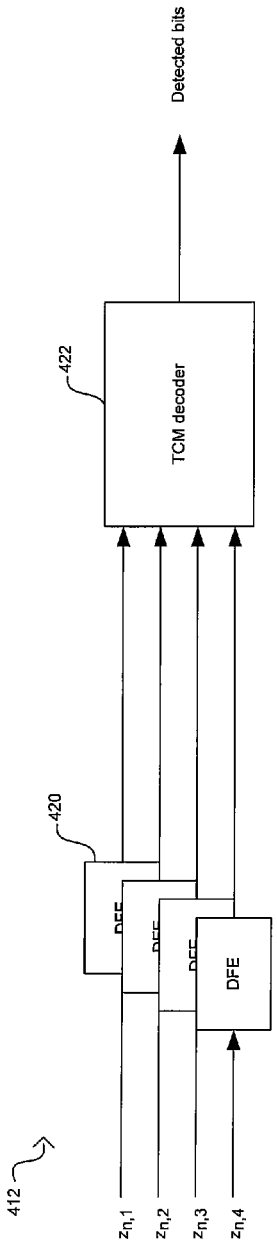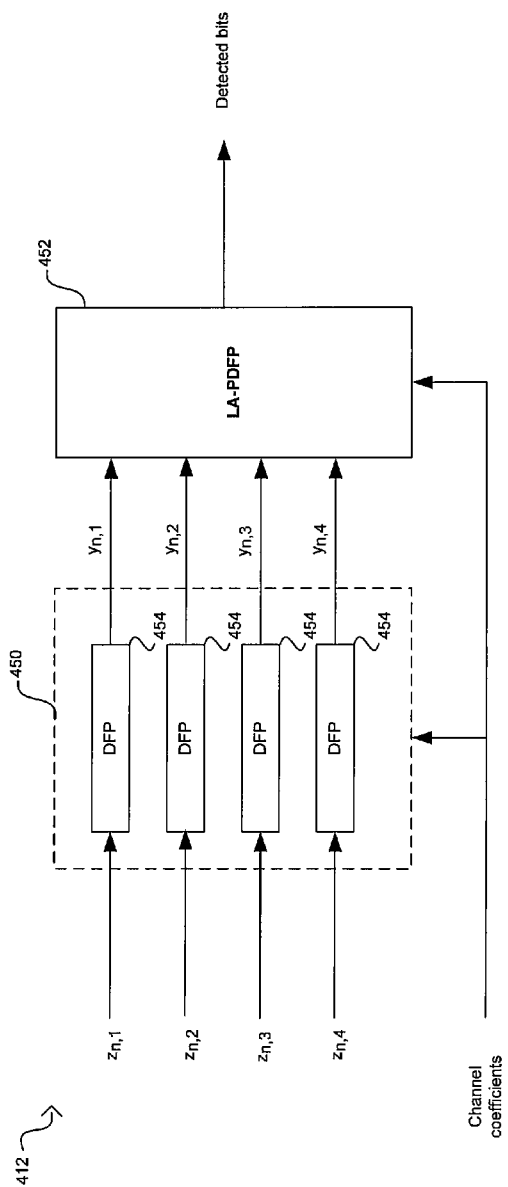
FIG. 4B
FIG. 4C

US 8,867,564 B2

METHOD AND SYSTEM FOR AN EXTENDED RANGE ETHERNET LINK DISCOVERY SIGNALING

CROSS-REFERENCE TO RELATED APPLICATIONS/INCORPORATION BY REFERENCE

This patent application makes reference to, claims priority to and claims benefit from U.S. Provisional Patent Application Ser. No. 60/826,161 filed on Sep. 19, 2006.

The above stated application is hereby incorporated by reference in its entirety.

FIELD OF THE INVENTION

Certain embodiments of the invention relate to high-speed wired communication. More specifically, certain embodiments of the invention relate to a method and system for an extended range Ethernet link discovery signaling.

BACKGROUND OF THE INVENTION

As the number of devices connected to data networks increase and higher data rates are required, there is a growing need for new transmission technologies enabling higher transmission rates over existing copper cabling infrastructures. Various efforts exist in this regard, including technologies that enable transmission rates that may even exceed Gigabits-per-second (Gbps) data rates over existing cabling. For example, the IEEE 802.3 standard defines the (Medium Access Control) MAC interface and physical layer (PHY) for Ethernet connections at 10 Mbps, 100 Mbps, 1 Gbps, and 10 Gbps data rates over twisted-pair copper cabling 100 m in length. With each 10× rate increase more sophisticated signal processing is required to maintain the 100 m standard cable range. However, connections longer than 100 m may require either the use of fiber or the placement of Ethernet switches, hubs, and/or repeaters, at mid-points in the connection to keep all cables less than 100 m in length.

Other efforts include the development of a standard for 10 Gigabits-per-second (Gbps) Ethernet transmission over twisted-pair cabling (10 GBASE-T). The emerging 10 GBASE-T PHY specification is intended to enable 10 Gbps connections over twisted-pair cabling at distances of up to 182 feet for existing cabling, and at distances of up to 330 feet for new cabling, for example. To achieve full-duplex transmission at 10 Gbps over four-pair twisted-pair copper cabling, elaborate digital signal processing techniques are needed to remove or reduce the effects of severe frequency-dependent signal attenuation, signal reflections, near-end and far-end crosstalk between the four pairs, and external signals coupled into the four pairs either from adjacent transmission links or other external noise sources. Moreover, new cabling specifications are being developed to diminish susceptibility to external electro-magnetic interferences.

Extending the range or distance at which standard based Ethernet PHY devices may operate with minimal changes to the PHY transceiver architectures that support, for example, 1 Gbps or 10 Gbps data rates, may enable new Ethernet PHY devices to be used and deployed in the broadband access market and possibly in new residential and enterprise applications. Moreover, features may be provided that may enable a single PHY device to operate in either a standard or an extended range mode of operation.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for an extended range Ethernet link discovery signaling, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 4B is a block diagram illustrating exemplary separate equalization and decoding operations for Gigabit Ethernet as described in FIG. 4A, in connection with an embodiment of the invention.

FIG. 4C is a block diagram illustrating exemplary joint equalization and decoding operations for Gigabit Ethernet as described in FIG. 4A, in connection with an embodiment of the invention.

DETAILED DESCRIPTION OF THE INVENTION

Certain embodiments of the invention may be found in a method and system for an extended range Ethernet link discovery signaling. Aspects of the invention may comprise a local Ethernet physical layer (PHY) device that may detect one or more active twisted-pair wires in a remote PHY based on signals communicated from the remote PHY. In this regard, the local and remote PHY may support standard and/or extended range operations. The local PHY may determine whether it is to operate as a master or slave based on the detected active twisted-pair wires. When operating as a master device, the local PHY may correct twisted-pair wire swap information received from the remote PHY before communicating an encoded link length value to the remote PHY. The link length value may correspond to an estimate of the length between the local and remote PHYs, for example. When operating as a slave device, the local PHY may transmit encoded twisted-pair wire swap information to the remote PHY before recovering a link length value communicated from the remote PHY.

The local PHY may communicate supported operating modes determined based on the link length value to the remote PHY. In this regard, the operating modes supported may be based on whether a standard or extended range operation is being utilized. Moreover, the local PHY may enable establishing a common full duplex operating mode with the remote PHY. In this regard, a full duplex operation may be established even when a single active twisted-pair wire exists between the local and remote PHYs. Moreover, the point-to-point Ethernet PHY transceivers that enable extended range operation may support full duplex operating modes for a plurality of link lengths for 1, 2, or 4 twisted-pair wires at a plurality of data rates.

Figure 1:
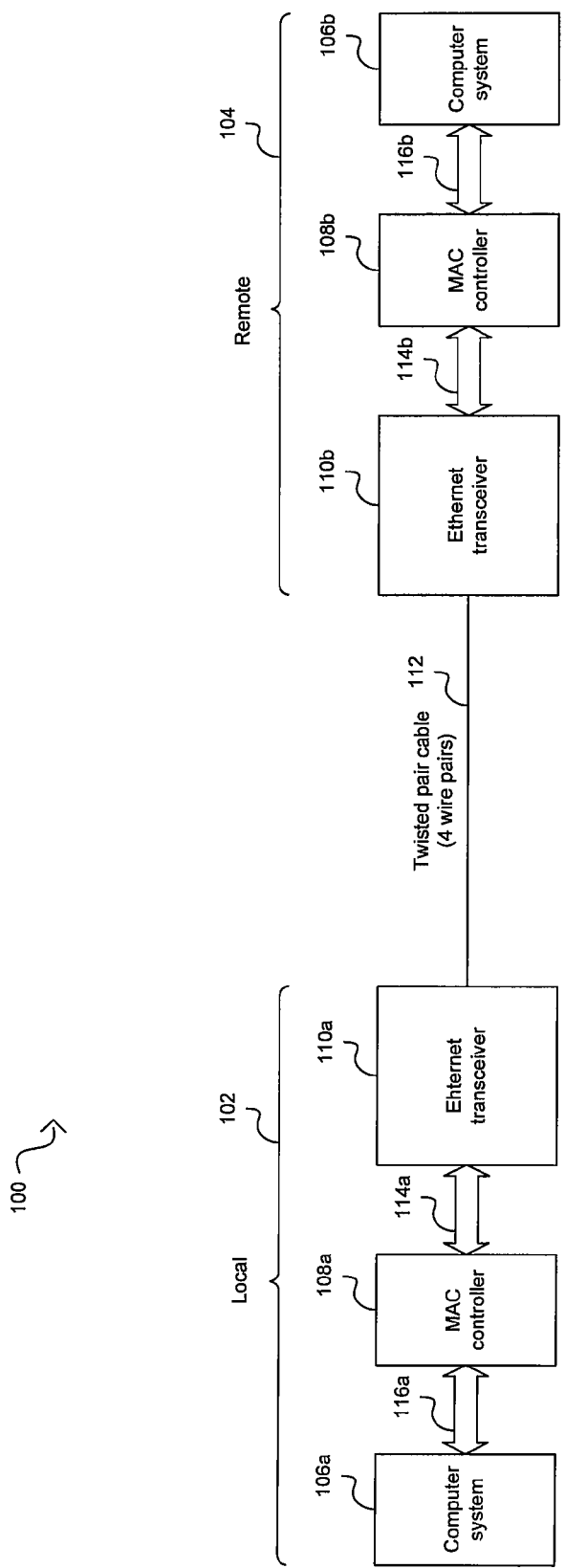
FIG. 1 is a block diagram illustrating an Ethernet over twisted-pair cabling link between a local link partner and a remote link partner, in connection with an embodiment of the invention.

FIG. 1 is a block diagram illustrating an Ethernet over twisted-pair cabling link between a local link partner and a remote link partner, in connection with an embodiment of the invention. Referring to FIG. 1, there is shown a system 100 that comprises a local link partner 102 and a remote link partner 104. The local link partner 102 and the remote link partner 104 communicate via a cable 112. The cable 112 may comprise up to four unshielded twisted-pairs (UTP) of copper cabling or wires, for example. The local link partner 102 and the remote link partner 104 may communicate via one or more twisted-pair wires comprised within the cable 112. When a single communication medium is possible between the local link partner 102 and the remote link partner 104, the cable 112 may correspond to a coaxial cable, for example. Certain performance and/or specifications criteria for UTP copper cabling have been standardized. For example, Category 3 cabling may provide the necessary performance for 10 Mbps Ethernet transmissions over twisted-pair cabling (10BASE-T). In another example, Category 5 cabling may provide the necessary performance for 1000 Mbps, or Gbps, Ethernet transmissions over twisted-pair cabling (1000BASE-T). In most instances, a lower category cable may generally have a greater insertion loss than a higher category cable.

The local link partner 102 comprises a computer system 106a, a medium access control (MAC) controller 108a, and a transceiver 104a. The remote link partner 104 comprises a computer system 106b, a MAC controller 108b, and a transceiver 110b. Notwithstanding, the invention is not limited in this regard.

The transceiver 110a may comprise suitable logic, circuitry, and/or code that may enable communication, for example, transmission and reception of data, between the local link partner 102 and a link partner, such as the remote link partner 104, for example. Similarly, the transceiver 110b may comprise suitable logic, circuitry, and/or code that may enable communication between the remote link partner 104 and a link partner, such as the local link partner 102, for example. The transceivers 110a and 110b may support, for example, Ethernet operations. The transceivers 110a and 110b may enable multi-rate communications, such as 10 Mbps, 100 Mbps, 1000 Mbps (or 1 Gbps) and/or 10 Gbps, for example. In this regard, the transceivers 110a and 110b may support standard-based data rates and/or non-standard data rates. Moreover, the transceivers 110a and 110b may support standard Ethernet link lengths or ranges of operation and/or extended ranges of operation. The transceivers 110a and 110b may enable communication between the local link partner 102 and the remote link partner 104 by utilizing a link discovery signaling (LDS) operation that enables detection of active operations in the other link partner. In this regard the LDS operation may be adapted for supporting a standard Ethernet operation and/or an extended range Ethernet operation.

The transceivers 110a and 110b may utilize multilevel signaling, for example. In this regard, the transceivers 110a and 110b may utilize pulse amplitude modulation (PAM) with various levels to represent the various symbols to be transmitted. For example, for 1000 Mbps Ethernet applications, a PAM5 transmission scheme may be utilized in each twisted-pair wire, where PAM5 refers to PAM with five levels $\{-2, -1, 0, 1, 2\}$.

The data transmitted and/or received by the transceivers 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical (PHY) layer, may provide services to layer 2 and layer 2 may provide services to layer 3.

In the embodiment of the invention illustrated in FIG. 1, the computer systems 106a and 106b may represent layer 3 and above, the MAC controllers 108a and 108b may represent layer 2 and above and the transceivers 110a and 110b may represent the operability and/or functionality of layer 1 or the PHY layer. In this regard, the transceivers 110a and 110b may be referred to as PHY devices or PHY transceivers, for example. The computer systems 106a and 106b comprise suitable logic, circuitry, and/or code that may enable operability and/or functionality of the five highest functional layers for data packets that are to be transmitted over the cable 112. Since each layer in the OSI model provides a service to the immediately higher interfacing layer, the MAC controllers 108a and 108b may provide the necessary services to the computer systems 106a and 106b to ensure that packets are suitably formatted and communicated to the transceivers 110a and 110b. During transmission, each layer adds its own header to the data passed on from the interfacing layer above it. However, during reception, a compatible device having a similar OSI stack strips off the headers as the message passes from the lower layers up to the higher layers.

The transceivers 110a and 110b may be configured to handle all the physical layer requirements, which include, but are not limited to, packetization, data transfer and serialization/deserialization (SERDES), in instances where such an operation is required. Data packets received by the transceivers 110a and 110b from MAC controllers 108a and 108b, respectively, may include data and header information for each of the above six functional layers. The transceivers 110a and 110b may be configured to encode data packets that are to be transmitted over the cable 112 and/or to decode data packets received from the cable 112.

The MAC controller 108a comprises suitable logic, circuitry, and/or code that may enable handling of data link layer, layer 2, operability and/or functionality in the local link partner 102. Similarly, the MAC controller 108b comprises suitable logic, circuitry, and/or code that may enable handling of layer 2 operability and/or functionality in the remote link partner 104. The MAC controllers 108a and 108b may be configured to implement Ethernet protocols, such as those based on the IEEE 802.3 standard, for example. Notwithstanding, the invention is not limited in this regard.

The MAC controller 108a may communicate with the transceiver 110a via an interface 114a and with the computer system 106a via a bus controller interface 116a. The MAC controller 108b may communicate with the transceiver 110b via an interface 114b and with the computer system 106b via a bus controller interface 116b. The interfaces 114a and 114b correspond to Ethernet interfaces that comprise protocol and/or link management control signals. The interfaces 114a and 114b may be multi-rate interfaces. The bus controller interfaces 116a and 116b may correspond to PCI or PCI-X interfaces. Notwithstanding, the invention is not limited in this regard.

Figure 2:
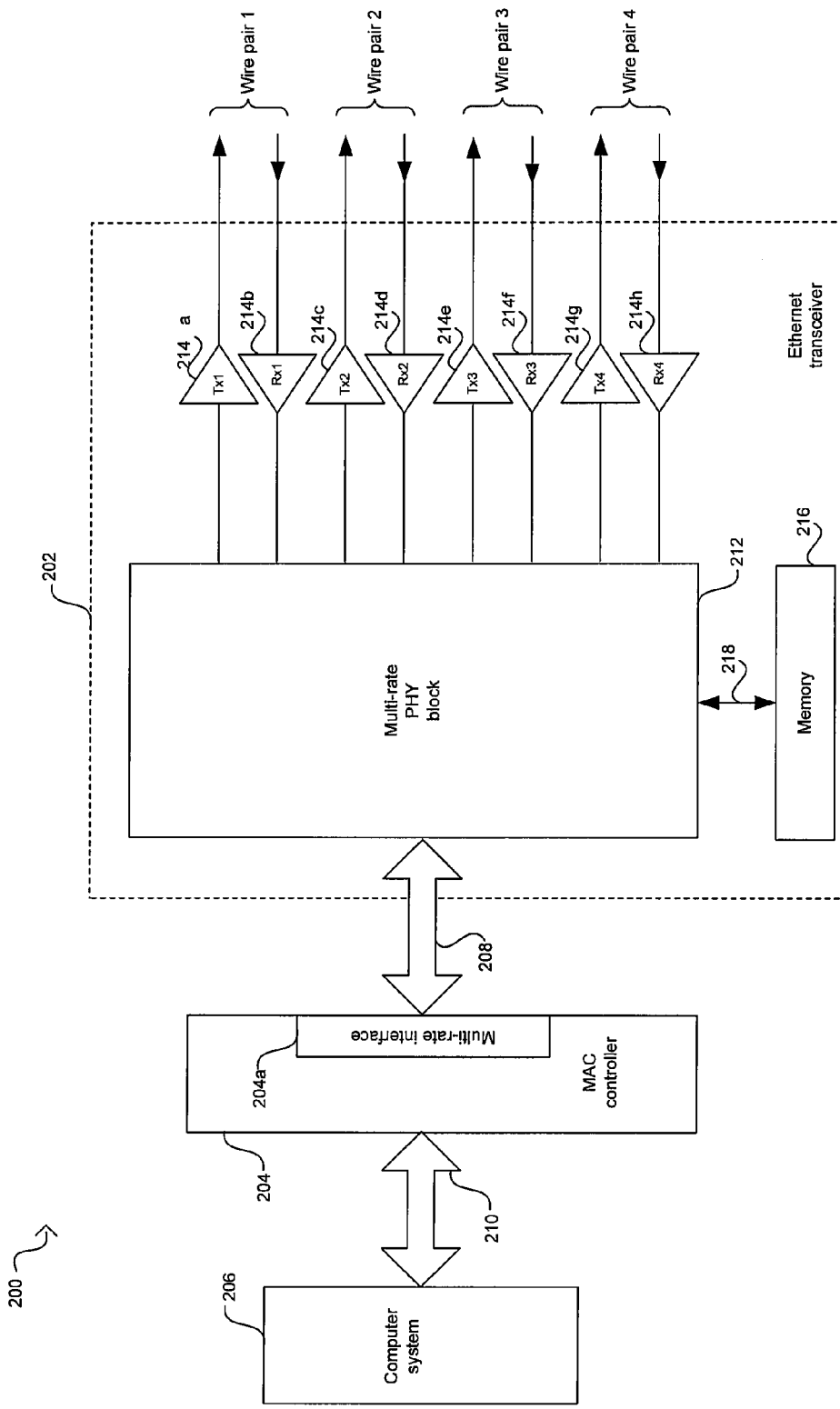
FIG. 2 is a block diagram illustrating an exemplary Ethernet transceiver multi-rate PHY layer architecture, in accordance with an embodiment of the invention.

FIG. 2 is a block diagram illustrating an exemplary Ethernet transceiver multi-rate PHY layer architecture, in accordance with an embodiment of the invention. Referring to FIG. 2, there is shown a link partner 200 that comprises a transceiver or PHY device 202, a MAC controller 204, a computer system 206, an interface 208, and a bus controller interface 210. The transceiver 202 may be an integrated device that comprises a multi-rate PHY block 212, a plurality of transmitters 214a, 214c, 214e, and 214g, a plurality of receivers 214b, 214d, 214f, and 214h, a memory 216, and a memory interface 218. The operation of the transceiver 202 may be the same as or substantially similar to that of the transceivers 110a and 110b disclosed in FIG. 1. In this regard, the transceiver 202 may provide layer 1 or PHY layer operability and/or functionality that enables communication with a remote PHY device. Similarly, the operation of the MAC controller 204, the computer system 206, the interface 208, and the bus controller 210 may be the same as or substantially similar to the respective MAC controllers 108a and 108b, computer systems 106a and 106b, interfaces 114a and 114b, and bus controller interfaces 116a and 116b as described in FIG. 1. The MAC controller 204 may comprise a multi-rate interface 204a that may comprise suitable logic, circuitry, and/or code to enable communication with the transceiver 202 at a plurality of data rates via the interface 208.

The multi-rate PHY block 212 in the transceiver 202 comprises suitable logic, circuitry, and/or code that may enable operability and/or functionality of PHY layer requirements. In this regard, the multi-rate PHY block 212 may enable generating the appropriate link discovery signaling utilized for establishing communication with a remote transceiver or PHY device in a remote link partner. The multi-rate PHY block 212 communicates with the MAC controller 204 via the interface 208. In one aspect of the invention, the interface 208 may be configured to utilize a plurality of serial data lanes for receiving data from the multi-rate PHY block 212 and/or for transmitting data to the multi-rate PHY block 212, in order to achieve higher operational speeds such as Gbps or 10 Gbps, for example. The multi-rate PHY block 212 may be configured to operate in one or more of a plurality of communication modes, where each communication mode implements a different communication protocol. These communication modes may include, but are not limited to, IEEE 802.3, 10 GBASE-T and other similar protocols. The multi-rate PHY block 212 may be configured to operate in a particular mode of operation upon initialization or during operation. The multi-rate PHY block 212 may also be configured to operate in an extended range mode.

In some instances, an auto-negotiation scheme may be utilized by the transceiver 202 to indicate or communicate to a remote link partner that the transceiver 202 is operating in an extended range mode. The auto-negotiation scheme may occur after or as a result of a link discovery signaling operation. The remote link partner may then configure itself to the appropriate extended range mode. Through standard auto-negotiation, a network link may be configured as an extended range from only one end of the link, ensuring interoperability between extended range enabled Ethernet transceivers and legacy devices. In this regard, the link discovery signaling may be adapted to enable establishing communication between extended range enabled Ethernet transceivers and legacy devices. In some instances, the link may be pre-configured and the transceivers fixed in an extended range mode.

The multi-rate PHY block 212 may be coupled to memory 216 through the memory interface 218, which may be implemented as a serial interface or a bus. The memory 216 comprises suitable logic, circuitry, and/or code that may enable storage or programming of information that includes parameters and/or code that may effectuate the operation of the multi-rate PHY block 212. The parameters may comprise configuration data and the code may comprise operational code such as software and/or firmware, but the information need not limited in this regard. Moreover, the parameters may include adaptive filter and/or block coefficients for use by the multi-rate PHY block 212, for example.

The transmitters 214a, 214c, 214e, and 214g may comprise suitable logic, circuitry, and/or code that may enable transmission of data from the link partner 200 to a remote link partner via the cable 212 in FIG. 1, for example. The receivers 214b, 214d, 214f, and 214h may comprise suitable logic, circuitry, and/or code that may enable receiving data from a remote link partner by the link partner 200. Each of the four pairs of transmitters and receivers in the transceiver 202 correspond to one of the four wires that may be comprised within the cable 212. For example, transceiver 214a and receiver 214b are utilized to communicate with a remote link partner via the first wire pair in the cable 212. Similarly, transceiver 214g and receiver 214h may be utilized to communicate with a remote link partner via the fourth wire pair in the cable 212. In this regard, at least one of the four transceiver/receiver pairs may be enabled to provide the appropriate communication rate. The link discovery signaling operation may enable communication in an extended range mode when at least one of the four twisted-pair wires is active.

Figure 3:
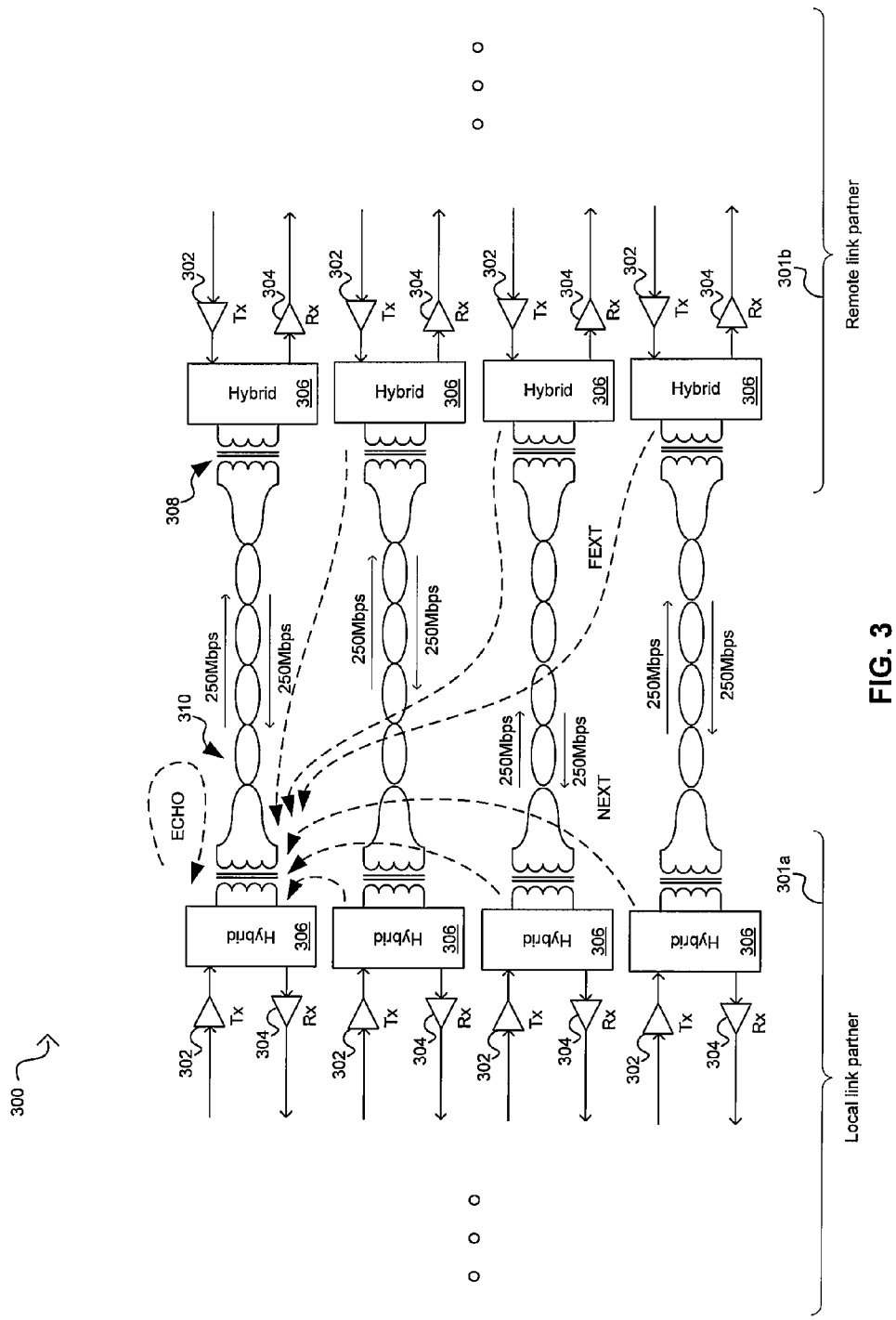
FIG. 3 is a block diagram illustrating ECHO, NEXT, and FEXT channel conditions in a Gigabit Ethernet system, in connection with an embodiment of the invention.

FIG. 3 is a block diagram illustrating ECHO, NEXT, and FEXT channel conditions in a Gigabit Ethernet system, in connection with an embodiment of the invention. Referring to FIG. 3, there is shown a Gigabit Ethernet system 300 that may comprise a local link partner 301a and a remote link partner 301b. The local link partner 301a and the remote link partner 301b may communicate via four twisted-pair wires 310 in full duplex operation. Each of the four twisted-pair wires 310 may support 250 Mbps data rates to provide an aggregate data rate of 1 Gbps. The local link partner 301a may comprise four hybrids 306. Each hybrid 306 in the local link partner 301a may be communicatively coupled to a transmitter 302, a receiver 304, and to one of the four twisted-pair wires 310. Similarly, the remote link partner 301b may comprise four hybrids 306. Each hybrid 306 in the remote link partner 301b may be communicatively coupled to a transmitter 302, a receiver 304, and to one of the four twisted-pair wires 310. The portions of the local link partner 301a and the remote link partner 301b shown in FIG. 3 may correspond to a portion of the physical (PHY) layer operations supported by the local link partner 301a and remote link partner 301b respectively.

Each hybrid 306 in the local link partner 301a or the remote link partner 301b may be communicatively coupled to or comprise a transformer 308. The hybrid 306 may comprise suitable logic, circuitry, and/or code that may enable separating the transmitted and received signals from a twisted-pair wire 310. The transmitters 302 may comprise suitable logic, circuitry, and/or code that may enable generating signals to be transmitted to a link partner at the other end of the link via a hybrid 306 and a twisted-pair wire 310. The receivers 304 may comprise suitable logic, circuitry, and/or code that may enable processing signals received from a link partner at the other end of the link via a twisted-pair wire 310 and a hybrid 306.

During operation, several conditions may occur in each of the twisted-pair wires 310. For example, intersymbol interference (ISI) may occur as a result of frequency dependent wire attenuation. As shown in FIG. 3, an ECHO component may be received in a twisted-pair wire 310 from an echo that results from the local transmitter 302 on the same twisted-pair wire 310. A near-end crosstalk (NEXT) component may also be received in a twisted-pair wire 310 from the local transmitters 302 corresponding to the three adjacent twisted-pair wires 310 in the same link partner. Moreover, a far-end crosstalk (FEXT) component may also be received in a twisted-pair wire 310 from the remote transmitters 302 in the link partner at the other end of the link. Notwithstanding the Gigabit Ethernet system 300 disclosed in FIG. 3, the invention need not be so limited.

Figure 4A:
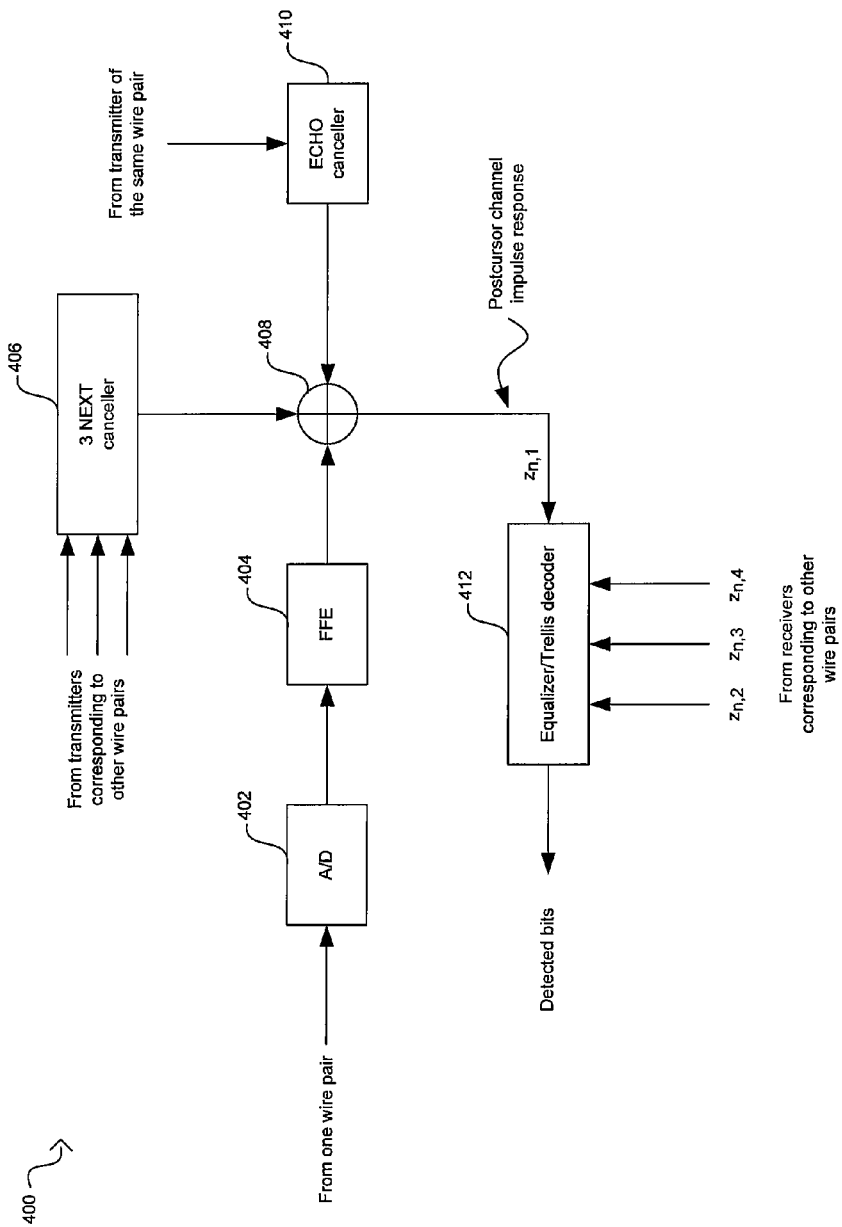
FIG. 4A is a block diagram illustrating exemplary signal processing operations on a received signal for Gigabit Ethernet, in connection with an embodiment of the invention.

FIG. 4A is a block diagram illustrating exemplary signal processing operations on a received signal for Gigabit Ethernet, in connection with an embodiment of the invention. Referring to FIG. 4A, there is shown a signal processing system 400 that may provide a portion of the signal processing performed by the PHY layer operations in an Ethernet transceiver. For example, the signal processing system 400 may be implemented in the multi-rate PHY block 212 and/or in the receivers 214b, 214d, 214f, and 214h in FIG. 2. The signal processing system 400 may comprise an analog-to-digital converter (A/D) 402, an adaptive feed-forward equalizer (FFE) 404, a 3 NEXT canceller 406, an adder 408, an ECHO canceller 410, and an equalizer/trellis decoder 412.

The A/D 402 may comprise suitable logic, circuitry, and/or code that may enable converting analog signals received via a twisted-pair wire into digital signals. The output of the A/D 402 may be communicated to the FFE 404. The FFE 404 may comprise suitable logic, circuitry, and/or code that may enable removal of precursor ISI to make the channel minimum-phase and to whiten the noise in the channel. The 3 NEXT canceller 406 may comprise suitable logic, circuitry, and/or code that may enable canceling at least a portion of the NEXT component received in the twisted-pair wire from the local transmitters corresponding to the three adjacent twisted-pair wires. The ECHO canceller 410 may comprise suitable logic, circuitry, and/or code that may enable canceling at least a portion of the ECHO component received in the twisted-pair wire from the local transmitter on the same twisted-pair wire.

The adder 408 may comprise suitable logic, circuitry, and/or code that may enable adding the output of the FFE 404, the 3 NEXT canceller 406, and/or the ECHO canceller to generate a postcursor channel impulse response, $z_{n,1}$. The equalizer/trellis decoder 412 may comprise suitable logic, circuitry and/or code that may enable equalizing the ISI that may result from the postcursor impulse response and decoding the trellis code. The equalizer/trellis decoder 412 may receive as inputs the postcursor channel impulse responses, $z_{n,2}$, $z_{n,3}$, and $z_{n,4}$ the corresponding to the other twisted-pair wires. The equalizer/trellis decoder 412 may generate the detected bits that correspond to the analog signal received.

FIG. 4B is a block diagram illustrating exemplary separate equalization and decoding operations for Gigabit Ethernet as described in FIG. 4A, in connection with an embodiment of the invention. Referring to FIG. 4B, there is shown the equalizer/trellis decoder 412 implemented as separate equalization and trellis decoding operations. The equalizer/trellis decoder 412 may comprise four decision-feedback equalizers (DFE) 420 and a trellis-coded modulation (TCM) decoder 422. The DFE 420 may comprise suitable logic, circuitry, and/or code that may enable removing the postcursor ISI for each twisted-pair wire. The TCM decoder 422 may comprise suitable logic, circuitry, and/or code that may enable executing a Viterbi algorithm on the code trellis to decode the trellis-coded symbols. The TCM decoder 422 may be implemented using a parallel decision-feedback decoding architecture, for example. The separate equalization and trellis decoding approach may provide low implementation complexity and the 1 Gbps data rate may be easily achieved.

FIG. 4C is a block diagram illustrating exemplary joint equalization and decoding operations for Gigabit Ethernet as described in FIG. 4A, in connection with an embodiment of the invention. Referring to FIG. 4C, there is shown the equalizer/trellis decoder 412 implemented as joint equalization and trellis decoding operations. The equalizer/trellis decoder 412 may comprise a decision-feedback prefilter (DFP) block 450 and a look-ahead parallel decision-feedback decoder (LA-PDFD) 452. The DFP block 450 may comprise four DFPs 454, one for each twisted-pair wire. The DFP 454 may comprise suitable logic, circuitry, and/or code that may enable shortening the postcursor channel memory. The LA-PDFP 452 may comprise suitable logic, circuitry, and/or code that may enable computing branch metrics in a look-ahead fashion. The training and adaptation of the channel coefficients may be utilized to improve the performance of the equalizer/trellis decoder 412 in FIG. 4D.

Figure 5A:
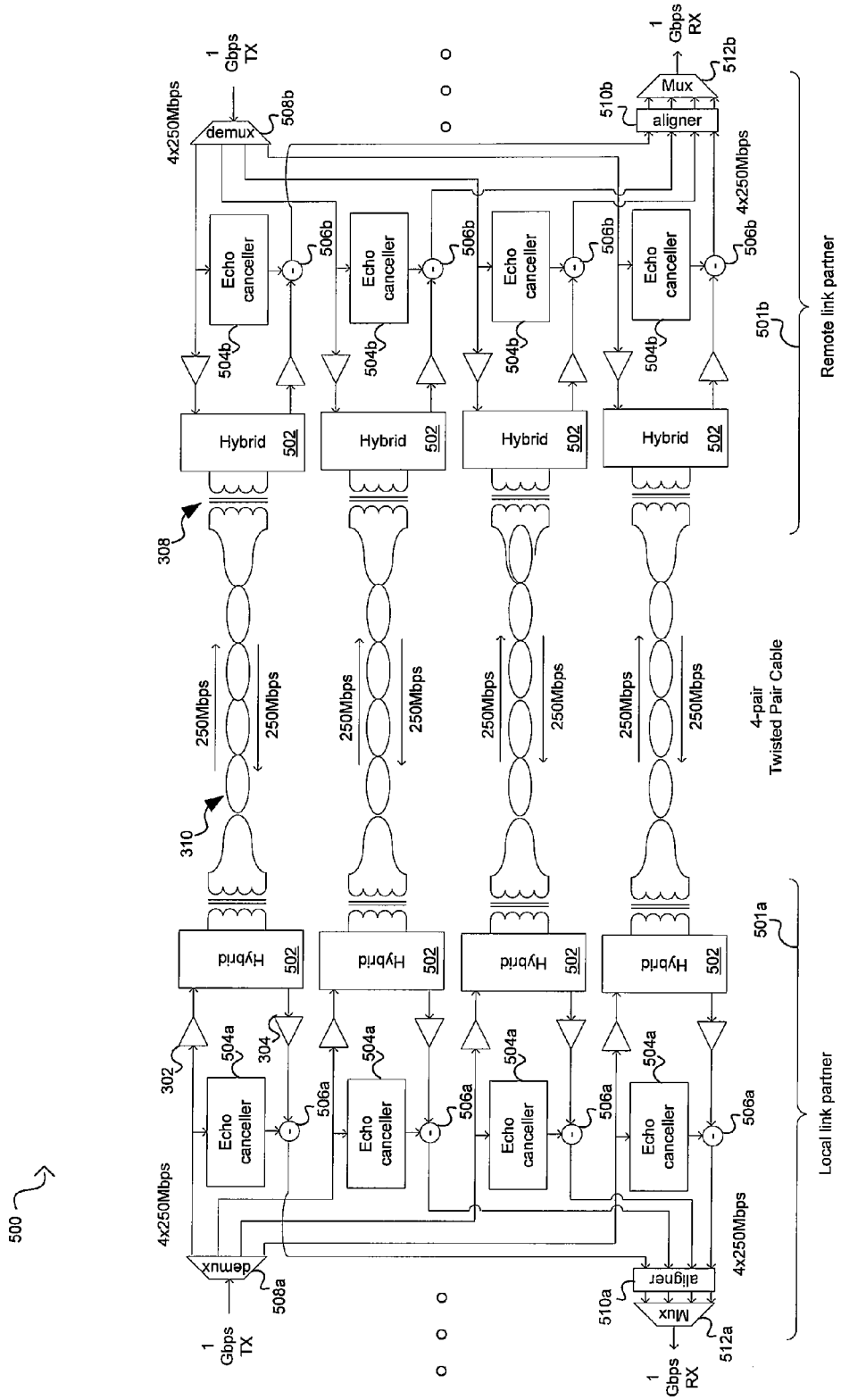
FIG. 5A is a block diagram of an exemplary Ethernet connection operating at 1000 Mbps over four-pair twisted-pair cabling, in connection with an embodiment of the invention.

FIG. 5A is a block diagram of an exemplary Ethernet connection operating at 1000 Mbps over four-pair twisted-pair cabling, in connection with an embodiment of the invention. Referring to FIG. 5A, there is shown an Ethernet system 500 operating at 1000 Mbps, or Gbps, that may comprise a local link partner 501a and a remote link partner 501b. The local link partner 501a and the remote link partner 501b may communicate via up to four active twisted-pair wires 310 in full duplex operation. Each of the four twisted-pair wires 310 may support 250 Mbps data rates to provide an aggregate data rate of 1 Gbps when all four twisted-pair wires are active. In some instances, either one or two of the twisted-pair wires 310 may be active, in which case the data rates supported by the Ethernet system 500 may be 250 Mbps and 500 Mbps respectively. The local link partner 501a may comprise four hybrids 502. The operation of the hybrid 502 may be the same or substantially similar to the operation of the hybrid 302 in FIG. 3. Notwithstanding, the invention is not so limited and may support various implementations of a hybrid circuitry. Each hybrid 502 in the local link partner 501a may be communicatively coupled to a transmitter 302, a receiver 304, and to one of the four twisted-pair wires 310. Associated with each hybrid 502 in the local link partner 501a are also an echo canceller 504a and a subtractor 506a. The local link partner 501a may also comprise a demultiplexer (demux) 508a, an aligner 510a, and a multiplexer (mux) 512a.

Similarly, the remote link partner 501b may comprise four hybrids 502. Each hybrid 502 in the remote link partner 501b may be communicatively coupled to a transmitter 302, a receiver 304, and to one of the four twisted-pair wires 310. Associated with each hybrid 502 in the remote link partner 501b are also an echo canceller 504b and a subtractor 506b. The remote link partner 501b may also comprise a demux 508b, an aligner 510b, and a mux 512b. The portions of the local link partner 501*a* and remote link partner 501*b* shown in FIG. 5A may correspond to a portion of the physical (PHY) layer operations supported by the local link partner 501*a* and remote link partner 501*b* respectively.

The demuxes 508*a* and 508*b* may comprise suitable logic, circuitry, and/or code that may enable separating a 1 Gbps signal into four 250 Mbps signals for transmission over the four twisted-pair wires. The aligners 510*a* and 510*b* may comprise suitable logic, circuitry, and/or code that may enable aligning the 250 Mbps signals received from each of the four twisted-pair wires. The muxes 512*a* and 512*b* may comprise suitable logic, circuitry, and/or code that may enable combining the aligned 250 Mbps signals from the aligner 510 to generate a 1 Gbps received signal.

The echo cancellers 504*a* and 504*b* may comprise suitable logic, circuitry, and/or code that may enable processing the signal to be transmitted via a transmitter 302 to at least partially cancel the ECHO component in the corresponding signal received via the receiver 304 associated with the same twisted-pair wire. The subtractors 506*a* and 506*b* may comprise suitable logic, circuitry, and/or code that may enable canceling the ECHO component from the received signal.

In operation, the local link partner 501*b* may separate a 1 Gbps signal to be transmitted into four 250 Mbps signals via the demux 508*a*. Each signal to be transmitted is processed by a transmitter 302 before being communicated to the corresponding twisted-pair wire via a hybrid 502. The four transmitted signals may arrive at the remote link partner 501*b* where each may be processed by a receiver 304 before echo cancellation occurs from the operation of a corresponding echo canceller 504*b* and subtractor 506*b*. The four received 250 Mbps signals may be aligned in the aligner 510*b* before being combined in the mux 512*b* into a 1 Gbps received signal.

Similarly, the remote link partner 501*b* may separate a 1 Gbps signal to be transmitted into four 250 Mbps signals via the demux 508*b*. Each signal to be transmitted may be processed by a transmitter 302 before being communicated to the corresponding twisted-pair wire via a hybrid 502. The four transmitted signals may arrive at the local link partner 501*a* where each may be processed by a receiver 304 before echo cancellation occurs from the operation of a corresponding echo canceller 504*a* and subtractor 506*a*. The four received 250 Mbps signals may be aligned in the aligner 510*a* before being combined in the mux 512*a* into a 1 Gbps received signal.

Figure 5B:
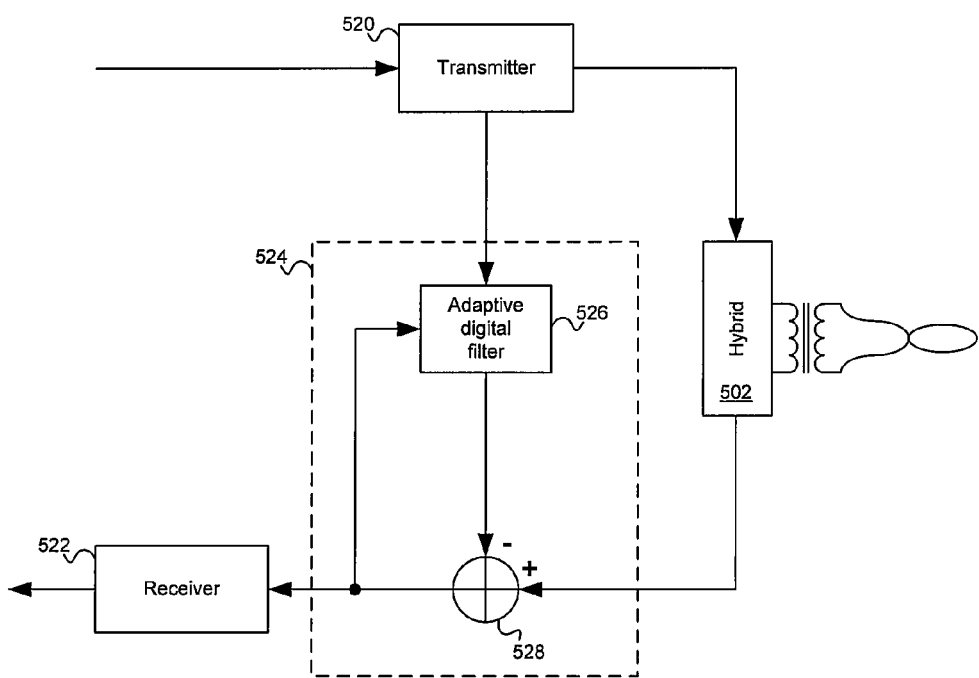
FIG. 5B is a block diagram of an exemplary echo canceller in a multi-rate PHY, in connection with an embodiment of the invention.

FIG. 5B is a block diagram of an exemplary echo canceller in a multi-rate PHY, in connection with an embodiment of the invention. Referring to FIG. 5B, there is shown an echo cancellation portion of a PHY layer operation for Gbps or 10 Gbps modes that comprises a transmitter 520, a receiver 522, a hybrid 502, and an echo cancellation block 524. The echo cancellation block 524 may comprise an adaptive digital filter 526 and a subtractor 528. The transmitter 520 may comprise suitable logic, circuitry, and/or code that may enable generating signals to be transmitted to a link partner at the other end of the link via the hybrid 502 and a corresponding twisted-pair wire. In this regard, the transmitter 520 may be utilized for transmitting signals associated with a link discovery signaling operation, for example. The receiver 522 may comprise suitable logic, circuitry, and/or code that may enable processing of echo-cancelled signals received from a link partner at the other end of the link via a corresponding twisted-pair wire and the hybrid 502. In this regard, the receiver 522 may be utilized for receiving signals associated with a link discovery signaling operation, for example.

The adaptive digital filter 526 may comprise suitable logic, circuitry, and/or code that may enable at least partial cancellation of the ECHO component of a received signal. In this regard, the adaptive digital filter 526 may utilize information regarding the transmitted and the received signals. The adaptive digital filter 526 may be an adaptive transversal digital filter that may implement a correlation algorithm, a stochastic iteration algorithm, and/or a sign algorithm, for example.

In operation, a signal may be received via the hybrid 502. The adaptive digital filter 526 may utilize information regarding signals being transmitted via the transmitter 520 to determine a noise component associated with the ECHO component to subtract from the received signal at the subtractor 528. The output of the subtractor 528 may be communicated to the receiver 522 and to the adaptive digital filter 526 to perform iterative echo cancellation operations.

Figure 6:
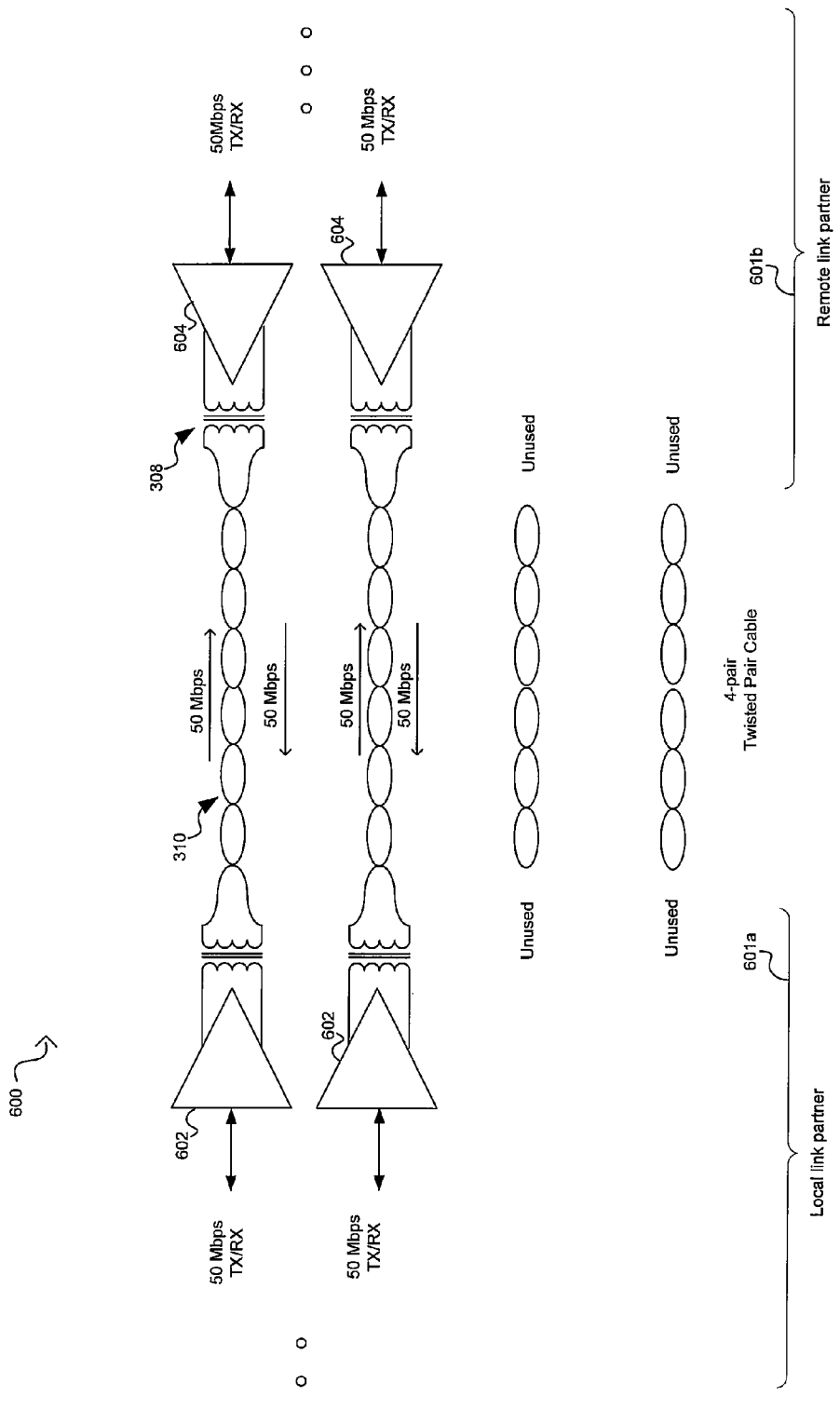
FIG. 6 is a block diagram of an exemplary full duplex Ethernet connection operating at 100 Mbps over a two-pair twisted-pair cabling, in accordance with an embodiment of the invention.

FIG. 6 is a block diagram of an exemplary full duplex Ethernet connection operating at 100 Mbps over a two-pair twisted-pair cabling, in accordance with an embodiment of the invention. Referring to FIG. 6, there is shown an Ethernet system 600 operating at full duplex, 100 Mbps. The Ethernet system 600 may comprise a local link partner 601*a* and a remote link partner 601*b*. The local link partner 601*a* and the remote link partner 601*b* may communicate via two twisted-pair wires 310, wherein each twisted-pair wire is operating at full duplex, 50 Mbps. Transmission and reception operations may be performed over each twisted-pair wire. In this exemplary embodiment, the two additional twisted-pair wires are shown as being unused. With each of the twisted-pair wires 310 in use supporting full duplex 50 Mbps data rates, the overall communication rate is 100 Mbps. The local link partner 601*a* may comprise PHY transceivers 602. The remote link partner 601*b* may comprise PHY transceivers 604.

The PHY transceivers 602 and 604 may comprise suitable logic, circuitry, and/or code that may enable transmission over a twisted-pair wire. The PHY transceivers 602 and 604 may, in some instances, transmit via a transformer 308 communicatively coupled to the transmitters. The PHY transceivers 602 and 604 may also enable receiving signals from a twisted-pair wire. The PHY transceivers 602 and 604 may, in some instances, receive signals via a transformer 308 communicatively coupled to the receivers.

The Ethernet system 600 may be utilized for extended range operations, for example. In this regard, the Ethernet system 600 may utilize a link discovery signaling (LDS) scheme that may enable extended range operations. For example, when the remote link partner 601*b* is within a standard link length value from the local link partner 601*a*, the LDS scheme may be utilized to detect active operations in the remote link partner 601*b* and to determine the operating modes that may be supported when the link length value complies with standard Ethernet requirements. In another example, when the remote link partner 601*b* is located in an extended range from the standard link length value from the local link partner 601*a* and the remote link partner 601*b* supports extended range operations, the LDS scheme may also be utilized to detect active operations in the remote link partner 601*b* and to determine the operating modes that may be supported for the extended range link length value.

In another embodiment of the invention, the local link partner 601*a* and the remote link partner 601*b* may communicate via a single twisted-pair wire 310, wherein the twisted-pair wire is operating at full duplex, 100 Mbps. In this regard, when a single communication or transmission medium may be supported between the local link partner 601*a* and the remote link partner 601*b*, a coaxial cable may be utilized instead of a single twisted-pair wire 310. Notwithstanding, the invention need not be so limited.

The LDS scheme may be enabled on power up, or on reset, for example, as a mechanism that may be utilized to determine an appropriate common operating mode for PHYs on both ends of the link. In this regard, the LDS may be a signaling scheme and protocol utilized in extended range operations for determining the number of twisted-pair wires connecting the two extended range PHYs, the twisted-pair wires connectivity ordering, master/slave PHY assignment for the two extended range PHYs, and/or for determining at least one operating mode common to both PHYs which may be utilized for maximizing data throughput, for example.

Figure 7:
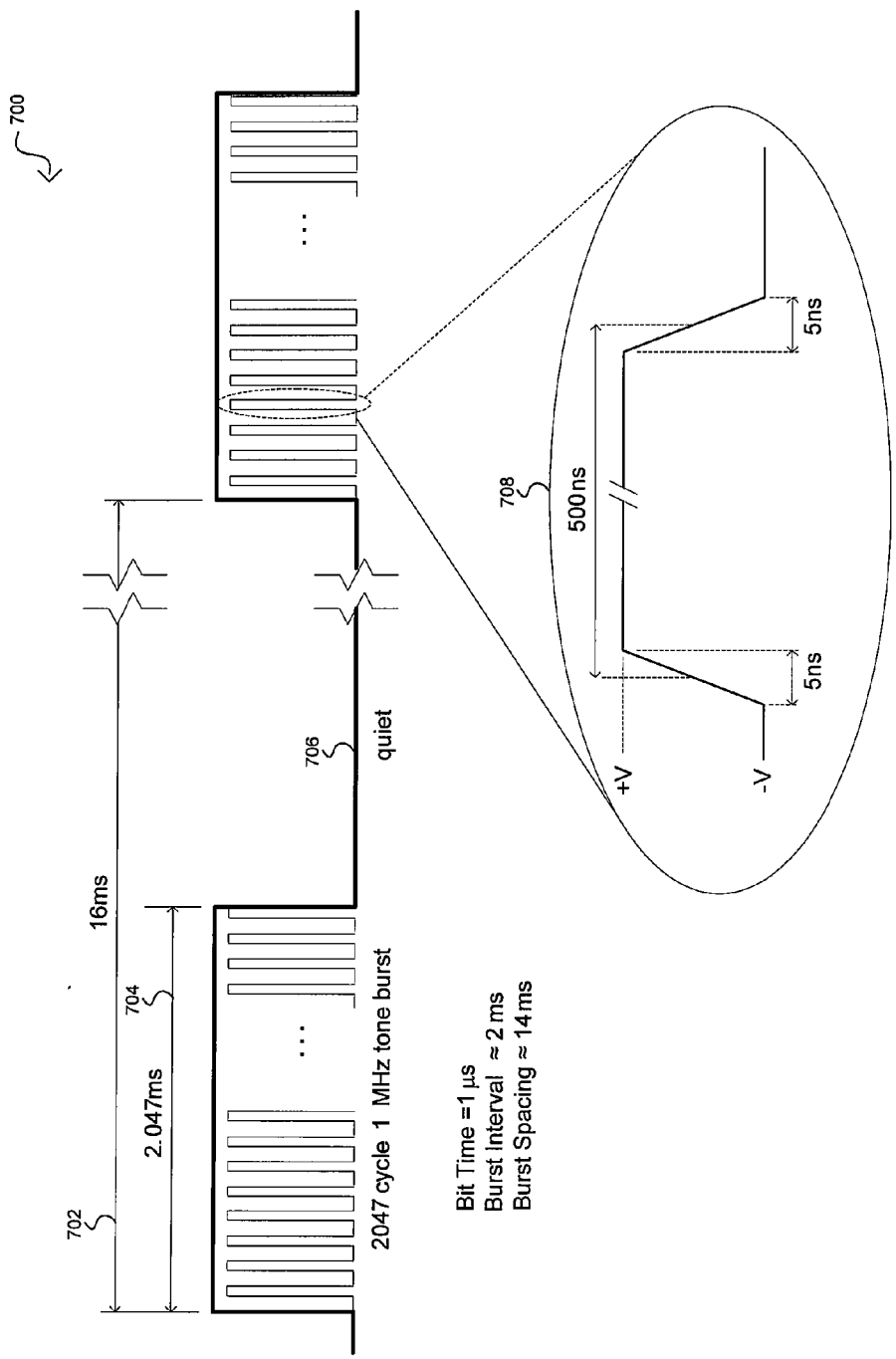
FIG. 7 is a diagram that illustrates and exemplary LDS signaling scheme, in accordance with an embodiment of the invention.

FIG. 7 is a diagram that illustrates an exemplary LDS signaling scheme, in accordance with an embodiment of the invention. Referring to FIG. 7, there is shown an LDS signal 700 that may comprise a period 702 which may be utilized during the initial phases of the LDS scheme. Within the period 702 there may be a tone burst portion 704 and a quiet portion 706. For the tone burst portion 704 of the LDS signal 700, a 1 MHz carrier, for example, may be gated or modulated by a logic signal with, for example, 12.5% duty cycle to create the approximately 2 ms tone burst portion 704, separated by approximately 14 ms of the quiet portion 706. The 1 MHz carrier signal may be rejected by Ethernet PHYs, which do not support extended range operation, such as those that support the IEEE 802.3 standard clause 14.3.1.3.2, for example. In this regard, other carrier frequencies may also be utilized that may not be accepted by IEEE compliant Ethernet PHYs. A cycle 708 of the tone burst portion 704 is also shown for a 1 MHz square carrier signal. Notwithstanding, the invention need not be limited in this regard and other carrier frequencies and waveforms may also be utilized in accordance with the operating requirements to enable extended range operation.

During subsequent phases of the LDS scheme, the 1 MHz carrier may be replaced by a maximal length pseudorandom number (PN) sequence derived from an 11-bit polynomial, for example. Moreover, during the final phases of the LDS scheme, the 1 MHz carrier may then be replaced by a repeating 16-bit data pattern encoding the PHY abilities scrambled by the 11-bit maximal length PN sequence.

Figure 8:
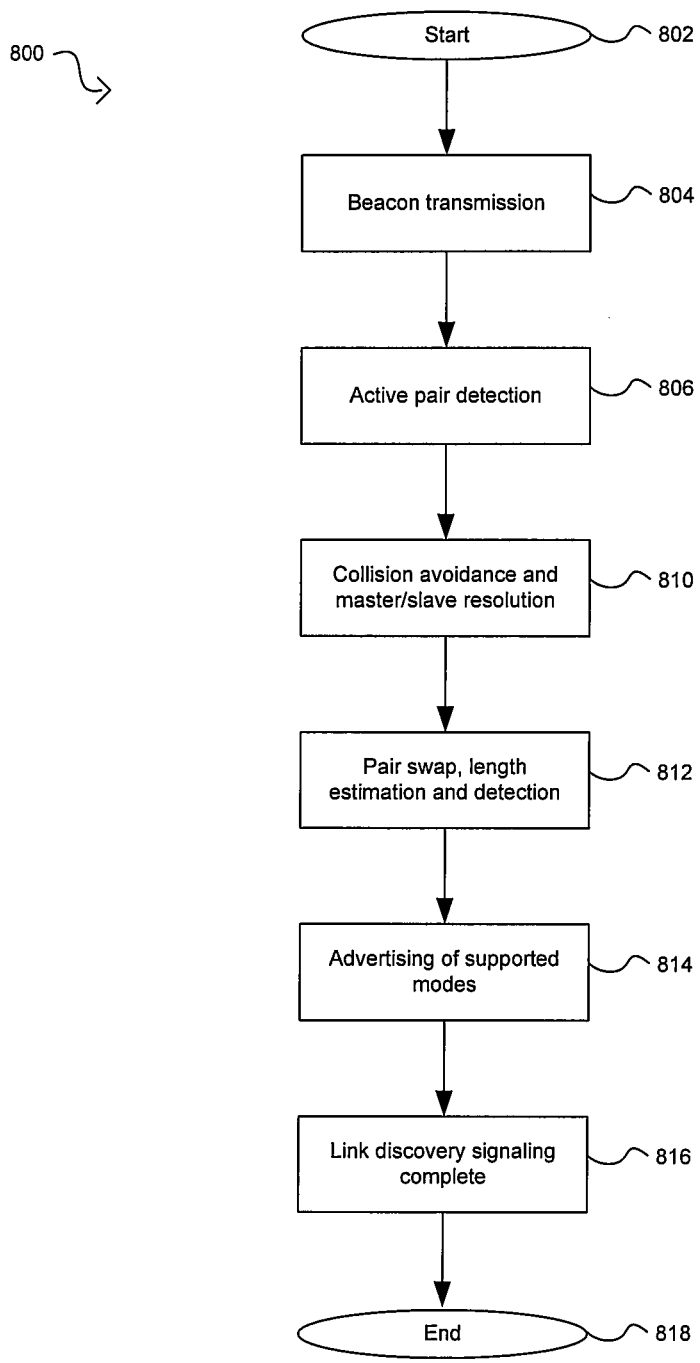
FIG. 8 is a flow diagram that illustrates exemplary steps for LDS signaling scheme, in accordance with an embodiment of the invention.

FIG. 8 is a flow diagram that illustrates exemplary steps for LDS signaling scheme, in accordance with an embodiment of the invention. Referring to FIG. 8, there is shown a flow diagram 800. In start step 802, each supported twisted-pair wire may be coupled to a transmitter and a receiver of a PHY in a full duplex configuration. In step 804, during power up or during a reset operation, for example, transmitters on all supported twisted-pair wires may begin transmitting a periodic series of tone bursts as shown in FIG. 7. The periodic series of tone bursts may be referred to as beacon signals, for example. Local receivers may be enabled during the approximately 14 ms intervals between tone bursts when the local transmitters are quiet. Additional quiet intervals may be created by each PHY by randomly deleting selected tone bursts. This may be accomplished by disabling the transmitters, for example. The receivers on each the supported twisted-pair wire may detect the 1 MHz tone bursts from the link partner during the local transmitter's quiet intervals. For PHYs that are compliant with the IEEE 802.3 standard and which do not support extended range Ethernet modes, the receivers may reject the beacon signals since their frequency is below a cutoff as disclosed in clause 14.3.1.3.2 of the standard.

In step 806, when the PHY detects a standard Ethernet link pulse rather than a tone burst as disclosed in FIG. 7, the PHY may transfer control to IEEE 802.3 standard clause 28 auto-negotiation operations. When a remote tone bursts as disclosed in FIG. 7 is detected on one of the twisted-pair wires by a corresponding receiver in a local PHY, the PHY may continue to detect remote tone bursts on the remaining twisted-pair wires for a specified period of time. For example, the PHY may be programmed to continue detecting for remote tone bursts on any remaining twisted-pair wire for which a remote tone burst has not yet been detected for a period of 100 ms, for example. Receivers, which do not detect remote tone bursts, may be assumed to be coupled to unused or inactive twisted-pair wires. Once the active twisted-pair wires have been identified based on the detected remote tone bursts, the PHY may disable or turn off the transmitters associated with the unused or inactive twisted-pair wires.

In step 810, in instances where a tone burst may be detected, the local transmitter associated with the detected tone burst may adjust a phase of the locally generated tone bursts to be approximately centered with the received tone bursts to avoid collisions. This adjustment to the phase of locally generated tone bursts may be maintained throughout the LDS scheme process, for example. In an embodiment of the invention, when the local PHY first detects a tone burst in a twisted-pair wire, the local PHY may operate as the master device with respect to the remote PHY. In this regard, the local PHY may stop sending the tone bursts to the remote device and may begin transmitting a maximum length sequence or 11-bit pseudo-random number (PN-11) sequence, for example. In another embodiment of the invention, when the remote tone burst detected by the local PHY comprises a PN-11 sequence, the local PHY may operate as a slave device with respect to the remote PHY. Notwithstanding, the invention need not be so limited.

In step 812, when the local PHY operates as a slave device, the local PHY may be utilized to encode information regarding the number of each active twisted-pair wire as a repeating pattern. For example, for a first twisted-pair wire, the repeating pattern may be 000100010001 . . . ; for a second twisted-pair wire, the repeating pattern may be 001100110011 . . . ; for a third twisted-pair wire, the repeating pattern may be 011101110111 . . . ; and for a fourth twisted-pair wire, the repeating pattern may be 111111110011 . . . . The local PHY device may scramble the repeating pattern corresponding to the twisted-pair wire number by utilizing self-synchronizing scrambled based on the PN-11 sequence received from the remote device. The local PHY may transmit the encoded information to the remote device. The local PHY may also receive a value of the cable or link length from the remote device. In this regard, the value of the cable or link length may be determined by the remote device operating as a master device and utilizing time domain reflectometry (TDR) or convergence based cable diagnostics, for example, during quiet intervals to estimate the length of the wire pairs.

When the local PHY is operating as a master device, the local PHY may recover twisted-pair number information that may have been transmitted as encoded information from the remote device. The local PHY may correct or swap twisted-pair wires in accordance with the information received. The local PHY may utilize quiet intervals between received tone bursts to estimate the cable or link length value. The local PHY may encode the estimated length in, for example, a 16-bit field with an 8-bit CRC in a repeating pattern with the first four bits set to zero. The following is an exemplary pattern illustrating the encoded estimated cable or link length:

$$\underbrace{1111...1}_{16b} \quad \underbrace{0000lengthCRC}_{24b} \quad \underbrace{1111...1}_{16b} \quad \underbrace{000...0}_{32b} ...$$

A self-synchronizing scrambler constructed from the PN-11 sequence may be utilized to scramble the estimated length. The local PHY operating as a master device may then transmit the scrambled estimated length during the tone interval to communicate the length to the link partner.

In step 814, each of the PHYs may utilize the estimated cable or link length value and the number of detected pairs to determine the subset of available operating modes to advertise as "supported" to the corresponding link partner. Supported operating modes may be encoded in a repeating pattern comprising a 16-bit field with an 8-bit CRC, for example. The 24-bit field may be delimited, repeated, and/or scrambled by the PN-11 sequence in a self-synchronizing configuration. In one embodiment of the invention, at least one of the bits in the 16-bit field may be utilized to indicate valid reception of the modes supported by the link partner. The following is an exemplary pattern illustrating the encoded supported operating modes to be advertise to the link partner:

$$\underbrace{1111...1}_{16b} \quad \underbrace{abilities}_{16b} \quad \underbrace{No.}_{8b} \quad \underbrace{CRC}_{8b} \quad \underbrace{1111...1}_{16b} \quad \underbrace{000...0}_{32b} ...$$

where the abilities field indicates information regarding mode being supported by the transmitting link partner. In an embodiment of the invention, 8-bits may be utilized to indicate the field number, for example. Up to 256 16-bit fields may be exchanged between the PHYs. In some instances, the final field may be indicated by a zero. In one embodiment of the invention, after three successive 16-bit fields are received without CRC errors, a PHY may generate an acknowledgement (AWK) bit, for example. Upon successful recognition of an acknowledgment for a given field from the link partner, the field number may be decremented and the next abilities field may be communicated. A self-synchronizing scrambler constructed from the PN-11 sequence may be utilized to scramble the supported operating modes. When the remote link partner has successfully received the final abilities field, which may be indicated via the AWK bit, and the local link partner has successfully received the final abilities field from the remote link partner, the process may proceed to step 816.

In step 816, when a PHY determines that it has successfully received the modes supported by the link partner via reception of 3 identical error-free final fields and also detects that the link partner has successfully received modes supported by the local PHY via reception of 3 identical error-free final fields with the acknowledge bit set, the PHY may disable the transmitters and may enable control to be passed to a start-up phase that enables to convergence and/or training of the receivers. After step 816, the process may proceed to end step 818.

In an exemplary embodiment of the invention, each PHY may be enabled to support up to 4 twisted-pair wires. It should be recognized that the invention is not limited in this regard, and more that 4 twisted-pair wires may be utilized.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for wired communication, the method comprising:
   detecting in a local physical device (PHY) which of one or more twisted-pairs are active and whether a range of a remote PHY is greater than 100 meters prior to performing any auto-negotiation procedure, wherein
   said local PHY and said remote PHY are communicatively coupled via said one or more twisted-pairs,
   said detecting is based on tone bursts received via said one or more twisted pairs during one or both of a power up operation and a reset operation of said local PHY,
   said tone bursts have a frequency of less than 2 MHz, which is in a cutoff area outside of a range of frequencies for receivers operating to receive Ethernet link pulses; and
   establishing an operating mode common to said local PHY and said remote PHY based on which of said one or more twisted-pairs are active and based on said detected range of said remote PHY.

2. The method according to claim 1, comprising detecting, in said local PHY, whether said one or more twisted-pairs are active based on said tone bursts, wherein each of said tone bursts comprises approximately 2 ms of a square wave having a frequency of approximately 1 MHZ.

3. The method according to claim 2, wherein said tone bursts are separated by quiet intervals.

4. The method according to claim 1, comprising transferring control of said local PHY operation to an autonegotiation operation when one or more active twisted-pairs are detected.

5. The method according to claim 1, wherein said one or more active twisted-pairs comprise 1, 2, or 4 active twisted-pairs.

6. The method according to claim 1, wherein said established operating mode operates at a plurality of data rates.

7. The method according to claim 1, comprising adjusting a phase of signals generated by a transmitter within said local PHY associated with a detected active twisted-pair.

8. The method according to claim 1 comprising disabling a transmitter in said local PHY associated with an inactive twisted-pair.

9. The method according to claim 1, comprising determining whether said local PHY operates as a master device or a slave device to said remote PHY based on said detected one or more active twisted-pairs.

10. The method according to claim 1, comprising continuing said detecting in said local PHY after a first active twisted-pair is detected.

11. The method according to claim 1, wherein said local PHY and said remote PHY each include an echo canceller configured to at least partially cancel an echo component of a received signal associated with said link discovery signaling operation.

12. A method for wired communication, the method comprising:
performing during one or both of a power up operation and a reset operation in a local PHY:
detecting in said local PHY whether one or more twisted-pairs are active, wherein said local PHY and a remote PHY are communicatively coupled via said one or more twisted-pairs;
generating tone bursts in one or more transmitters within said local PHY for transmission to said remote PHY to indicate which of said one or more twisted-pairs are active prior to performing any auto-negotiation procedure, wherein
said tone bursts have a frequency of less than 2 MHz, which is in a cutoff area outside of a range of frequencies for receivers operating to receive Ethernet link pulses;
determining whether said local PHY is a master or slave device to said remote PHY based on said detected one or more active twisted-pairs;
when said local PHY is a master device, enumerating said one or more twisted-pairs based on twisted-pair number information received from said remote PHY before communicating a link length value to said remote PHY;
when said local PHY is a slave device, transmitting twisted-pair number information to said remote PHY before recovering a link length value communicated from said remote PHY, wherein said twisted-pair number information enables enumerating said one or more twisted-pairs;
communicating to said remote PHY operating modes supported by said local PHY based on said link length value; and
establishing a full duplex operating mode common to said local PHY and said remote PHY, said full duplex operating mode being selected from a specified range mode and an extended range mode based on said link length value.

13. The method according to claim 12, comprising determining that a particular twisted-pair is active upon detecting, in a receiver within said local PHY, signals communicated by said remote over said particular twisted-pair.

14. The method according to claim 12, comprising encoding said twisted-pair number information for transmission when said local PHY is a slave device.

15. The method according to claim 12, comprising encoding said link length value for transmission when said local PHY is a master device.

16. A system for wired communication, the system comprising:
a local PHY that is operable to:
detect which of one or more twisted-pairs are active and whether a range of a remote PHY is greater than 100 meters prior to performing any auto-negotiation procedure, wherein
said local PHY and said remote PHY are communicatively coupleable via said one or more twisted-pairs during said detecting; and
said detecting is based on tone bursts received via said one or more twisted pairs during one or both of a power up operation and a reset operation of said local PHY, and
said tone bursts have a frequency of less than 2 MHz, which in a cutoff area outside of a range of frequencies for receivers operating to receive Ethernet link pulses; and
establish an operating mode common to said local PHY and said remote PHY based on which of said one or more twisted-pairs are active and based on said detected range of said remote PHY.

17. The system according to claim 16, wherein said local PHY is operable to detect whether said one or more twisted-pairs are active based on said tone bursts, wherein each of said tone bursts comprises approximately 2 ms of a square wave having a frequency of approximately 1 MHz.

18. The system according to claim 17, wherein said tone bursts are separated by quiet intervals.

19. The system according to claim 16, wherein said local PHY is operable to transfer control of said local PHY operation to an autonegotiation operation when one or more active twisted-pairs are detected.

20. The system according to claim 16, wherein said one or more active twisted-pairs comprise 1, 2, or 4 active twisted-pairs.

21. The system according to claim 16, wherein said established operating mode operates at a plurality of data rates.

22. The system according to claim 16, wherein said local PHY is operable to adjust a phase of signals generated by a transmitter within said local PHY associated with a detected active twisted-pair.

23. The system according to claim 16, wherein said local PHY enables disabling a transmitter in said local PHY associated with an inactive twisted-pair.

24. The system according to claim 16, wherein said local PHY enables continuing said detection in said local PHY after a first active twisted pair is detected.

25. The system according to claim 16, wherein said local PHY is configured to correct twisted-pair wire swap information received from said remote PHY before communicating an encoded link length value to said remote PHY, when said local PHY operates as a master device; and wherein said local PHY is configured to transmit encoded twisted-pair wire swap information to said remote PHY before recovering a link length value communicated from said remote PHY, when said local PHY operates as a slave device.

26. A system for wired communication, the system comprising:
a local PHY that during one or both of a power up operation and a reset operation, is operable to:
detect one or more active twisted-pairs, wherein said local PHY and a remote PHY are communicatively coupleable via said one or more twisted-pairs;
generate tone bursts in one or more transmitters within said local PHY for transmission to said remote PHY to indicate which of said one or more twisted-pairs are active prior to performing any auto-negotiation procedure, wherein said tone bursts have a frequency of less than 2 MHz, which in a cutoff area outside of a range of frequencies for receivers operating to receive Ethernet link pulses determine whether said local PHY is a master or slave device to said remote PHY based on said detected one or more active twisted-pairs;

when said local PHY is a master device, enumerate said one or more twisted-pairs based on twisted-pair number information received from said remote PHY before communicating a link length value to said remote PHY;

when said local PHY is a slave device, transmit twisted-pair number information to said remote PHY before recovering a link length value communicated from said remote PHY, wherein said twisted-pair number information enables enumerating said one or more twisted-pairs:

communicate to said remote PHY operating modes supported by said local PHY based on said link length value; and establish a full duplex operating mode common to said local PHY and said remote PHY, said full duplex operating mode being selected from a specified range mode and an extended range mode based on said link length value.

27. The system according to claim 26, wherein said local PHY is operable to determine that a particular twisted-pair is active upon detecting, in a receiver within said local PHY, signals communicated by said remote over said particular twisted-pair.

28. The system according to claim 26, wherein said local PHY is operable to encode said twisted-pair number information for transmission when said local PHY is a slave device; and wherein said local PHY is operable to encode said link length value for transmission when said local PHY is a master device.

29. The system according to claim 26, wherein said local PHY and said remote PHY each include an echo canceller configured to at least partially cancel an echo component of a received signal associated with said link discovery signaling operation.

30. A system for wired communication, the system comprising:

a local PHY that is operable to detect an active communication medium that comprises a coaxial cable and whether a range of a remote PHY is greater than 100 meters prior to performing any auto-negotiation procedure, wherein said local PHY and said remote PHY are communicatively coupleable via said communication medium that comprises said coaxial cable during said detecting; and said detecting is based on tone bursts received via one or more twisted pairs during one or both of a power up operation or a reset operation of said local PHY, said tone bursts have a frequency of less than 2 MHz, which is in a cutoff area outside of a range of frequencies for receivers operating to receive Ethernet link pulses; and establish an operating mode common to said local PHY and said remote PHY for communication via said detected active communication medium that comprises said coaxial cable, wherein said established operating mode is determined based on said detected range of said remote PHY.

31. The system for wired communication according to claim 30, wherein said local PHY and said remote PHY each include a multi-rate interface to enable multi-rate communications.

* * * * *